March 24, 1931. A. SZEGVARI ET AL 1,797,248

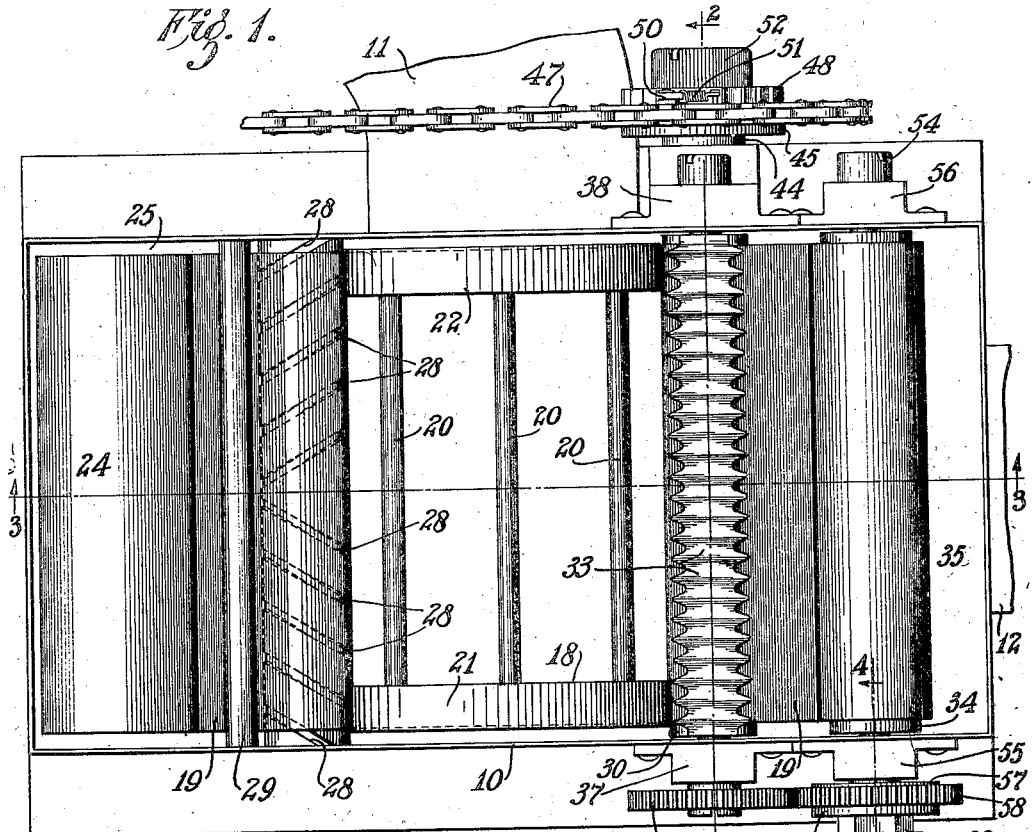
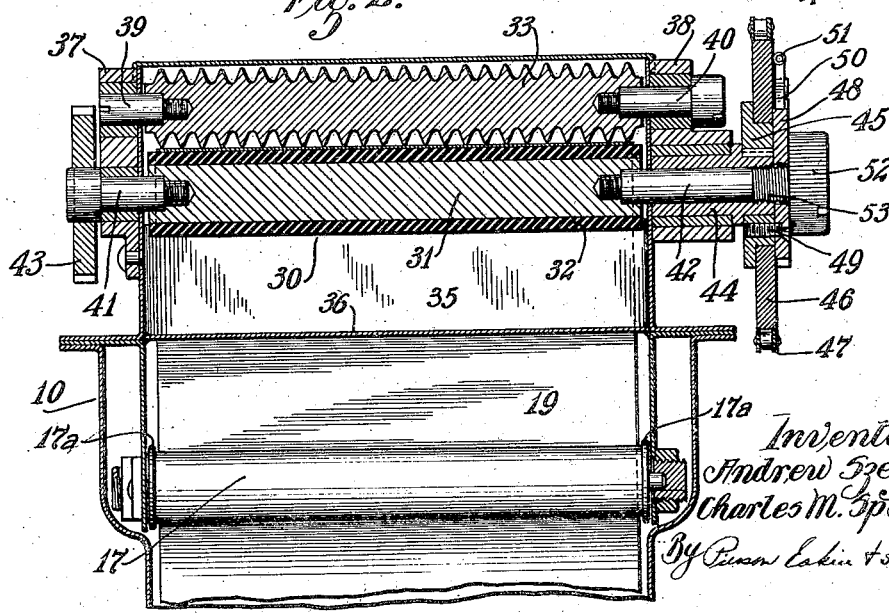

FILTERING METHOD AND APPARATUS

Filed July 20, 1927 2 Sheets-Sheet 2

Inventors
Andrew Szegvari
Charles M. Spencer
By Pierce Eakin + Avery
Attys.

Patented Mar. 24, 1931

1,797,248

UNITED STATES PATENT OFFICE

ANDREW SZEGVARI AND CHARLES M. SPENCER, OF AKRON, OHIO, ASSIGNORS, BY MESNE ASSIGNMENTS, TO AMERICAN ANODE INC., OF AKRON, OHIO, A CORPORATION OF DELAWARE

FILTERING METHOD AND APPARATUS

Application filed July 20, 1927. Serial No. 207,123.

This invention relates to an improved method and apparatus for filtering, and more particularly to the continuous filtration of liquid dispersions of materials, for example, natural or artificial aqueous dispersions of rubber, in which there is, under certain conditions, agglomeration of the dispersed particles.

In the manufacture of articles from dispersed rubber or latex composition, whether by impregnation, coating, or electrodeposition, it is desirable that the liquid dispersion maintain a circulation or flow of constant uniform speed past the form or foundation material upon which the dispersed particles are to be deposited, and that any agglomerates of precipitated or coagulated constituents of the dispersion be constantly removed so as not to be deposited upon the article in process and create a rough or uneven surface thereon.

It is an object of this invention to provide filtering apparatus which will have the minimum coagulating effect upon the dispersed material of the liquid being filtered, and which will permit uniform flow of said dispersion at all times. More specifically our invention aims to provide a filter which uniformly will remove from the dispersion all particles greater than a determinate size irrespective of the quantity filtered. Another object is to provide means for impelling filtering material across the course of the flowing dispersion at a constant uniform speed. A further object is to provide filtering apparatus in which there is no friction of mechanical members in contact with the material being filtered.

Figure 3:
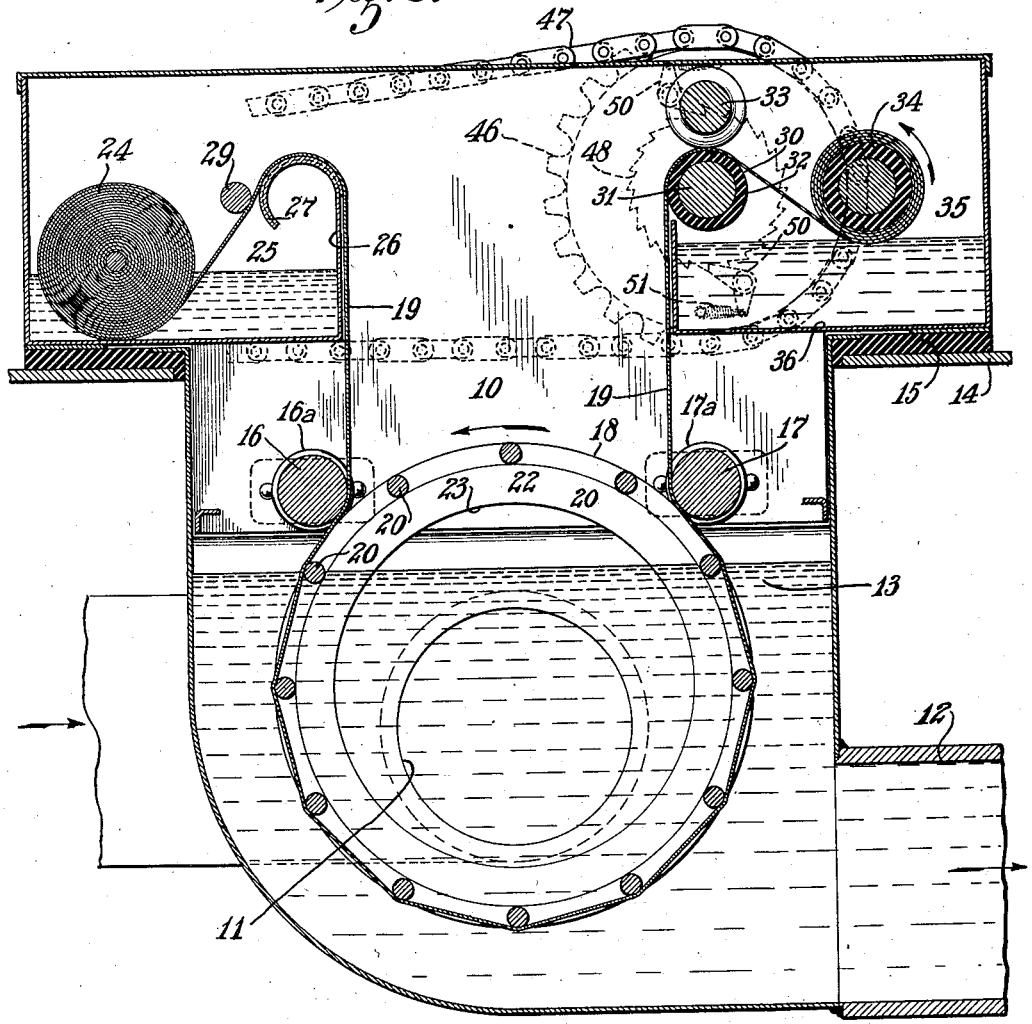
Figure 4:
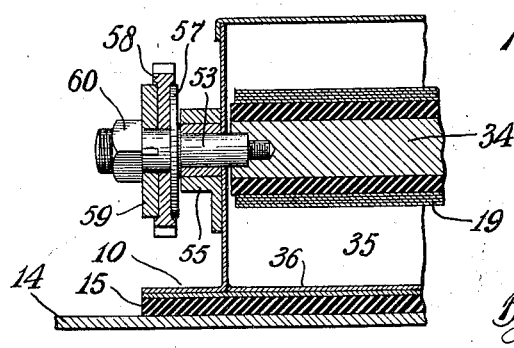

Of the accompanying drawings:

Fig. 1 is a plan view of apparatus embodying and adapted to carry out our invention in its preferred form, the cover of the apparatus being removed. Fig. 2 is a section on line 2—2 of Fig. 1. Fig. 3 is a section on line 3—3 of Fig. 1. Fig. 4 is a section on line 4—4 of Fig. 1.

Referring to the drawings, 10 represents generally a container or receptacle, and 11 is an inlet thereto and 12 an outlet therefrom for the fluid 13 to be filtered, said container being so positioned in a fluid-circulating system that the fluid will flow thereinto by gravity but will never reach a level much above that shown in Fig. 3 of the drawings. We have found it desirable for the filtering of rubber-latex compositions to provide a filtering structure which is not affected by the corrosive ingredients of the composition, and therefore prefer to construct said container and its metal parts entirely of one of the "stainless" steels which embody a chromium alloy. Alternatively, the container may be provided with a lining of vulcanized rubber or other suitable material, and certain parts may be constructed of hard rubber.

The container 10 is mounted in an opening in a suitable support or table 14 and is insulated therefrom by any suitable dielectric material such as the hard rubber mat 15. This prevents agglomeration of dispersed particles in suspension from any stray electric currents or galvanic currents which otherwise might reach it. This possibility also may be offset by the use of the rubber-lined container aforementioned.

Journaled in opposite walls within the container and above the liquid-level thereof is a pair of parallel, spaced apart, cylindrical guide and bearing-rollers 16, 17, formed with respective end-flanges 16a, 16a, 17a, 17a, said rollers together comprising positioning means and bearings for a cylindrical, open-surfaced drum 18 which is suspended in the bight of a continuous, driven filter-screen 19 which passes substantially around said drum, the latter being almost submerged in the liquid 13.

The drum 18 comprises a circumferential series of parallel spaced rods 20, 20 which are mounted at their ends in respective end-plates 21, 22 of the drum, the drum-ends being positioned close to the opposite walls of the container, and the end-plate 22, which is nearest the inlet 11 of the container, being formed with a relatively large aperture 23 to permit liquid issuing from said inlet to flow into the interior of the drum.

The filter-screen 19 preferably comprises a long strip of fibrous textile material having relatively fine open mesh of uniform size.

Said strip initially is in the form of a supply roll 24 and rests loosely within a water-containing compartment 25 in the upper part of the container and at one side thereof, said compartment being defined on one side and its ends by the container walls and on its bottom and other side by an angular L-shaped plate 26 which is welded to said container walls to effect a fluid-tight junction therewith. The free, upper marginal portion of the vertical wall of the plate 26 is inwardly rolled so that it describes a semi-circular bead or rim 27 and the outer face of said rim is scored with diverging grooves 28, 28 which exert a tentering effect upon the filter screen 19 as the latter is drawn thereover, from the supply-roll 24 to the drum 18, the arrangement of the wall 26 and the bearing-roller 16 being such that the filter screen does not slide on said wall, thereby avoiding friction therewith.

A roller 29 journaled in the opposite container walls is positioned close to the inner margin of the rim 27 and serves as a tensioning means for the filter-screen 19 which passes under said roller and thereby is held in frictional contact with the tentering face of said rim 27 throughout the major portion of the latter's area.

For drawing the filter-screen 19 from its supply-roll 24 and around the drum 18, there is provided a driven feed-roll 30 which is positioned near the top of the container parallel to and in a vertical plane with the bearing-roller 17, and which comprises a rigid mandrel or core 31, and a surface-cover 32 of soft rubber compound. Associated with the feed-roll 30 is an idler presser-roller 33 which has its surface formed in alternating circumferential ribs or flanges and grooves, said ribs bearing against the yielding surface 32 of the feed-roll 30 to hold the filter-screen 19, as it passes therebetween, in good frictional contact with said feed-roll. Any lumpy agglomerates adhering to the filter-screen either will pass between the flanges of the presser-roller, or upon engaging said flanges will be crowded laterally and then pass between them, thus insuring that they will not be squeezed from the screen and fall back into the unfiltered liquid.

Posterior to the feed-roll 30 is a rewinding roll 34 upon which the used filter-screen 19 is wound, said roll being power-driven from the feed-roll 30 but with provision for slippage to effect equal surface speeds of said feed-roll and rewinding roll as the diameter of the latter is increased by the screen material wrapped thereon, as hereinafter will be described.

The feed-roll 30, presser-roll 33 and rewinding-roll 34 are positioned within a compartment 35 in the upper part of the container, said compartment being defined by the container walls and an L-shaped plate 36 welded to the latter to effect a fluid-tight junction therewith. Said compartment preferably contains water for keeping the rewound material moist so that it may be easily removed from the rewinding roll 34, and also serves to catch any liquid which may be squeezed from the clogged filter-screen and dropped from the feed-roll 30.

For supporting and driving the driven members of the apparatus, bearing brackets 37, 38 are mounted on opposite outside walls of the container, the journals of said brackets being aligned with suitable apertures through the container walls, and the presser-roll 33 is provided with end-trunnions 39, 40 which are loosely journaled in the upper portion of the respective brackets. The feed-roll 30 is provided with trunnions 41, 42, the trunnion 41 being journaled in the lower portion of the bracket 37 and having a gear 43 affixed to its outer end outside said bracket. The trunnion 42 extends through a flanged sleeve 44 which is journaled in the lower portion of the bracket 38, and keyed to said sleeve 44 is a flanged hub or collar 45 upon which is journaled a sprocket 46 connected by a sprocket-chain 47 with suitable driving means (not shown) such as gear-reduction mechanism associated with a motor. A ratchet 48 is secured to the outer end-face of the hub 45 by screws, such as the screw 49 and partly overlies the sprocket 46 to retain the same on its hub 45, the ratchet teeth being engaged by pawls 50, 50 which are pivotally secured to said sprocket 46 and held in latched position by respective tension springs 51, 51. The trunnion 42 is formed on its outer end with a knob 52, and screw-threads 53 adjacent said knob, said screw-threads extending through an axial bore in the ratchet 48 and engaging complemental threads in the sleeve 44. Thus the rotation of the sprocket 46 will drive the feed-roll 30 through the pawls 50, ratchet 48, hub 45, sleeve 44 and trunnion 42, and manual rotation of the knob 52 will rotate the feed-roll through the trunnion 42, at which time the hub 45 will slide freely within the sprocket 46 and the teeth of the ratchet 48 pass freely under the pawls 50.

The rewinding-roll 34 is provided with trunnions 53, 54 which extend through the opposite container walls and are journaled in respective bearing-brackets 55, 56 secured to the outer face of said walls. The trunnion 53 is formed with a flange 57 comprising a lateral abutment for a gear 58 loosely journaled on said trunnion, and a friction disc 59 keyed to the trunnion is urged against the opposite face of said gear by a nut 60 threaded onto the end portion of the trunnion. The gear 58 is meshed with the gear 43 and preferably has the same number of teeth as the latter, being driven thereby at the same speed.

In the operation of the apparatus, a supply-roll of filtering material 24 is deposited in the water in the compartment 25 and the leading end of the filter-strip 19 threaded through the apparatus and secured to the rewinding roll 34 as shown, the feed-roll 30 being manually rotated to expedite the operation. Power is applied to drive the feed-roll 30 and rewinding-roll 34, and liquid to be filtered is admitted to the container through the inlet 11, said liquid passing into the drum 18 and through the filter screen around the same and being withdrawn through the outlet 12, any suspended particles larger than the desired degree of fineness being retained in the meshes of the screen.

The most efficient rate of travel of the filter screen depends upon the fineness of its mesh and the volumetric flow of the liquid but experience has demonstrated that only relatively slow movement (a few inches an hour) is required for the filtration of liquid dispersions of rubber, so that a roll of filtering material lasts two or three days and undue agitation of the dispersion is avoided. Fresh supply-rolls of the filter-screen are introduced into the apparatus by attaching the leading end of the fresh roll to the trailing end of the old roll before the latter is drawn from the moistening compartment 25.

The filter-screen, being wet when it enters the liquid, will not absorb water from the latter and thus modify the concentration of the dispersion or cause agglomeration of dispersed particles therein. The rewound filter-screen is kept moist by the water in the compartment 35 so that it is easily removed from the rewinding-roll 34. The materials collected on the used filter subsequently may be reclaimed, and the filter may be cleansed for reuse if desired.

The constantly-moving continuous filter-screen insures uniformity of filtering and also insures uniformity of flow of the liquid through its interstices. The use of an open cylindrical drum for holding the filter-screen insures a relatively large filtering area as compared with the area of the fluid inlet, without corresponding increase in the size of the filtering apparatus.

Since the filter-screen supports and drives the drum, the use of shafts, bearings and stuffing boxes is avoided with resulting economy of cost to manufacture, and the elimination of sliding friction which otherwise would cause agglomeration of dispersed particles in the liquid being filtered.

Modifications may be resorted to within the scope of the appended claims and we do not limit our invention to the specific construction shown or the exact procedure described.

We claim:

1. Filtering apparatus comprising a container having an inlet and an outlet for the passage of a fluid, a strip of filtering material formed in a bight which traverses the course of said fluid, and an open-surface drum supported by said bight.

2. Filtering apparatus comprising a container adapted to hold a fluid, an inlet and outlet therefor, an open-surface drum, and a strip of filtering material passing around said drum and supporting it out of contact with any structure beneath the surface of said fluid.

3. Filtering apparatus comprising an open-surface drum, a strip of filtering material passing around said drum and supporting it upwardly against bearing supports, and means for the communication of a fluid with the interior and exterior respectively of said drum.

4. Apparatus for filtering coagulable liquid suspensions, comprising means for maintaining a strip of filtering material in an open bight, such means being supported by said strip, means for feeding said strip, and means for directing the suspensions respectively toward and away from the two sides of the strip of filtering material.

5. Filtering apparatus comprising an open-surface drum, a strip of filtering material passing around said drum and supporting it upwardly against a pair of rollers located above the surface of the fluid to be filtered, means for feeding said strip at a constant slow speed, and means for rewinding the used strip of material while maintaining it in a moist condition.

6. Filtering apparatus comprising an open-surface drum, a strip of filtering material passing around said drum and supporting it upwardly against a pair of rollers located above the surface of the fluid to be filtered, and means for progressively feeding said strip.

7. Filtering apparatus comprising an open-surface drum, a strip of filtering material passing around said drum and supporting it upwardly against a pair of rollers, means for progressively feeding said strip, means for moistening said strip prior to its passage around the drum and means for passing a fluid to be filtered through the portion of the said strip in contact with said drum.

8. Filtering apparatus comprising an open surface drum partially immersed in the fluid to be filtered, a strip of filtering material passing around said drum and supporting it upwardly against a pair of rollers, means for progressively feeding said strip, means for tentering the strip prior to its passage around the drum, and means for passing the fluid through the strip of filtering material surrounding the drum.

9. Filtering apparatus comprising a container adapted to hold a fluid to be filtered, an open-surface drum partially immersed in said fluid, a strip of filtering material passing around said drum and supporting it upwardly against a pair of rollers but out of contact with any structures beneath the surface of the fluid, means for progressively feeding said strip, means for moistening said strip prior to its passage over the drum, and a duct communicating with the interior of the drum.

10. Filtering apparatus comprising a container adapted to hold a fluid to be filtered, an open-surface drum partially immersed in said fluid, a strip of filtering material passing around said drum and supporting it upwardly against a pair of rollers but out of contact with any structures beneath the surface of the fluid, means for progressively feeding said strip, means for moistening and means for tentering said strip prior to its passage around the drum, and a duct communicating with the interior of the drum.

In witness whereof we have hereunto set our hands this 14th day of June, 1927.

ANDREW SZEGVARI.
CHARLES M. SPENCER.